(12) United States Patent
Billman et al.

(10) Patent No.: US 11,763,272 B1
(45) Date of Patent: Sep. 19, 2023

(54) SYSTEMS AND METHODS FOR USING TOKENIZED AND DYNAMIC PHYSICAL CHECKS

(71) Applicant: United Services Automobile Association (USAA), San Antonio, TX (US)

(72) Inventors: Bradly Jay Billman, Celina, TX (US); Jennifer Hunt Erickson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 96 days.

(21) Appl. No.: 17/243,239

(22) Filed: Apr. 28, 2021

Related U.S. Application Data

(60) Provisional application No. 63/018,240, filed on Apr. 30, 2020.

(51) Int. Cl.
*G06Q 40/02* (2023.01)
*G06Q 20/38* (2012.01)
*G06K 19/077* (2006.01)
*G06K 19/073* (2006.01)
*G06K 19/06* (2006.01)
*G06Q 20/04* (2012.01)

(52) U.S. Cl.
CPC ....... *G06Q 20/042* (2013.01); *G06K 19/0614* (2013.01); *G06K 19/07345* (2013.01); *G06K 19/07381* (2013.01); *G06K 19/07707* (2013.01); *G06Q 20/385* (2013.01); *G06Q 40/02* (2013.01)

(58) Field of Classification Search
CPC .............................. G06Q 20/042; G06Q 40/02
USPC ............................................ 235/379; 705/45
See application file for complete search history.

(56) References Cited

U.S. PATENT DOCUMENTS

| | | | |
|---|---|---|---|
| 6,195,452 B1 * | 2/2001 | Royer | G06K 17/00 382/137 |
| 7,703,678 B2 * | 4/2010 | Gelbman | G06F 3/1454 340/5.91 |
| 7,974,921 B1 * | 7/2011 | Al Amri | G06Q 20/342 235/3 |
| 2019/0012673 A1 * | 1/2019 | Chakraborty | G07D 7/206 |
| 2020/0184460 A1 * | 6/2020 | Gatchalian | G06K 19/07701 |

* cited by examiner

*Primary Examiner* — Suezu Ellis
(74) *Attorney, Agent, or Firm* — Fletcher Yoder P.C.

(57) ABSTRACT

Embodiments are described herein for systems and methods for authenticating tokenized and/or dynamic physical checks, and authorizing transfers of funds in response to the authentication. In particular, in certain embodiments, a method includes identifying, using at least one processor, a dynamic authentication code of a physical check. The method also includes automatically authenticating, using the at least one processor, the physical check based at least in part on the identified dynamic authentication code. The method further includes automatically authorizing, using the at least one processor, a transfer of funds in response to the authentication of the physical check.

20 Claims, 8 Drawing Sheets

US 11,763,272 B1

SYSTEMS AND METHODS FOR USING TOKENIZED AND DYNAMIC PHYSICAL CHECKS

CROSS-REFERENCE TO RELATED APPLICATION

The present disclosure is related to, and claims priority to, U.S. Provisional Patent Application Ser. No. 63/018,240, titled "Systems and Methods for Using Tokenized and Dynamic Physical Checks," which was filed on Apr. 30, 2020, and which is herein incorporated by reference in its entirety for all purposes.

BACKGROUND

The present disclosure relates generally to systems and methods for authenticating tokenized and/or dynamic physical checks.

Checks typically provide a safe and convenient method for an individual such as a payor to transfer funds to a payee. To use a check, the individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee. Certain types of checks are backed by the issuing bank. Accordingly, they may be preferred for transactions in which the payor/payee wish to have additional levels of protection.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include systems and methods for authenticating tokenized and/or dynamic physical checks, and authorizing transfers of funds in response to the authentication. In particular, in certain embodiments, a method includes identifying, using at least one processor, a dynamic authentication code of a physical check. The method also includes automatically authenticating, using the at least one processor, the physical check based at least in part on the identified dynamic authentication code. The method further includes automatically authorizing, using the at least one processor, a transfer of funds in response to the authentication of the physical check.

In addition, in certain embodiments, a physical check includes circuitry configured to be activated to activate a dynamic authentication code of the physical check. The dynamic authentication code comprises a single use tokenized version of an account number associated with the physical check. In addition, the dynamic authentication code is configured to uniquely identify the physical check and to authorize a transfer of funds in response to authentication of the physical check based at least in part on the dynamic authentication code.

In addition, in certain embodiments, a physical check authentication system includes a physical check having a display device and circuitry. The circuitry is configured to initiate display of a dynamic authentication code via the display device in response to activation of the circuitry. In addition, the physical check authentication system includes an authenticator that includes at least one processor configured to read the dynamic authentication code from the display device, and to authorize a transfer of funds in response to authentication based on the authentication code.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
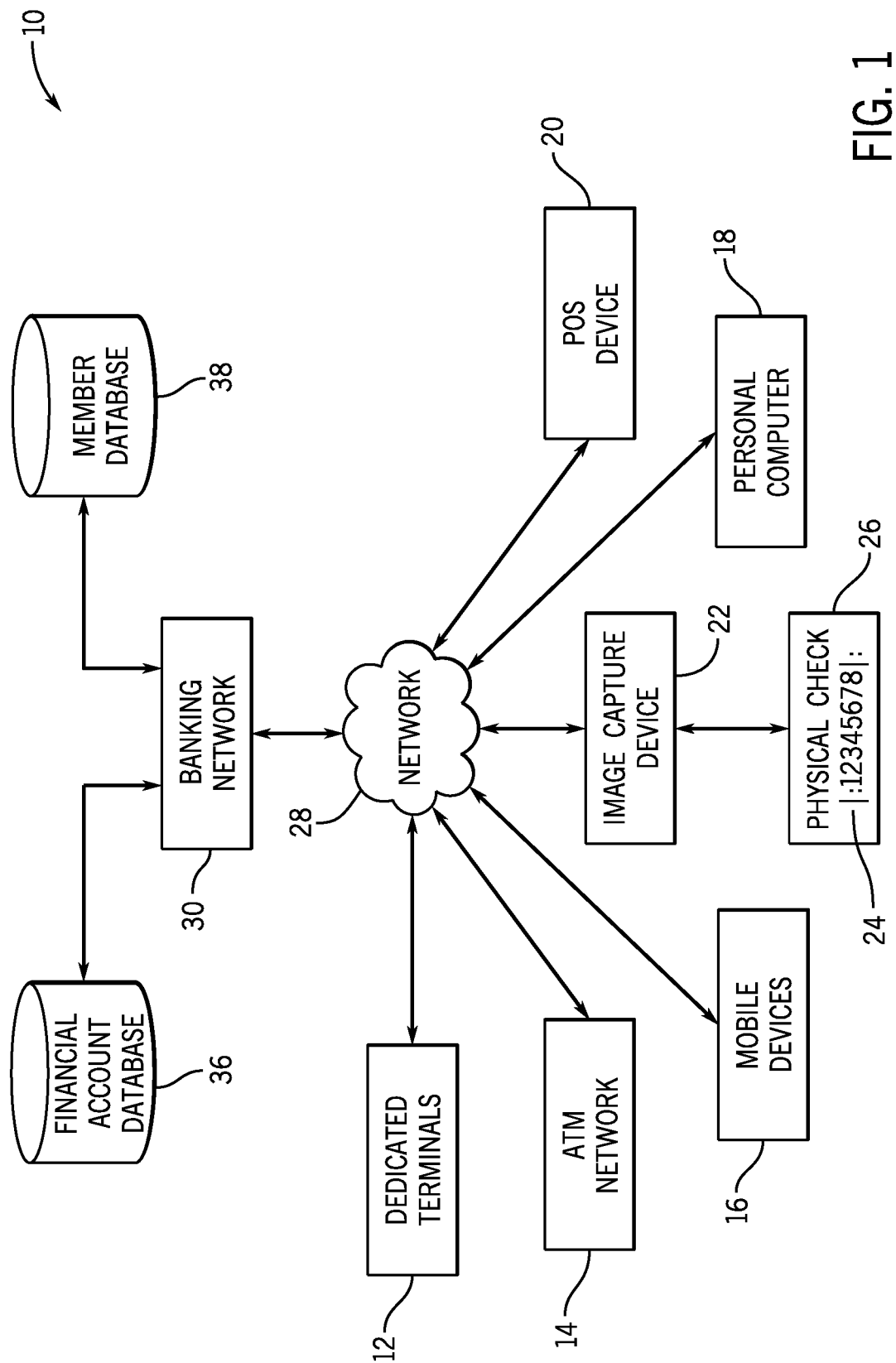
FIG. 1 illustrates an example of an operating environment in which physical checks having tokenized and/or dynamic authentication codes may be utilized, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the terms "real time" and substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

Various embodiments of the present disclosure generally relate to systems and methods for authenticating tokenized and/or dynamic physical checks, and authorizing transfers of funds in response to the authentication. In particular, physical checks may include tokenized and/or dynamic authentication codes that may be automatically authenticated by a check processing system. In certain embodiments, the tokenized and/or dynamic authentication codes of the physical checks may be single use, tokenized versions of account numbers associated with the physical checks. In addition, in certain embodiments, the tokenized and/or dynamic authentication codes may be activated by activating circuitry of the physical checks, thereby causing the tokenized and/or dynamic authentication codes to become visible (e.g., by activating a display device of the circuitry) and, in certain embodiments, activating color coding by, for example, making the tokenized and/or dynamic authentication codes glow with appropriate colors. For example, in certain embodiments, the circuitry of the physical checks may be activated based at least in part on moisture applied to a battery of the physical checks.

In other embodiments, the circuitry of the physical checks may be activated based at least in part on a control signal received from a computing device, for example, when a physical check is paired with the computing device. Indeed, in certain embodiments, the tokenized and/or dynamic authentication code for a particular physical check may be generated via software (e.g., application) being executed on a computing device that has activated the particular physical check. In addition, in certain embodiments, the circuitry of the physical checks may be activated and/or deactivated by inductance provided to and/or discontinued from the circuitry of the physical checks by the computing device. In addition, in certain embodiments, a display device of the physical checks may be destroyed in response to an invalid attempt to activate tokenized and/or dynamic authentication codes associated with the physical checks.

In addition, in certain embodiments, the tokenized and/or dynamic authentication codes may be deactivated after a predetermined period of time by deactivating the circuitry of the physical checks, thereby causing the tokenized and/or dynamic authentication codes to become invisible (e.g., by deactivating a display device of the circuitry). For example, in certain embodiments, the circuitry of the physical checks may be deactivated when a battery of the physical checks that activate the circuitry runs out of power.

FIG. 1 illustrates an example of an operating environment 10 (e.g., a physical check authentication system) in which some embodiments of the present disclosure may be utilized. The embodiments of the present disclosure illustrated in FIG. 1 allow user interactions through various points of interaction such as, but not limited to, dedicated terminals 12, ATM networks 14, mobile devices 16, personal computers 18, point of sale (POS) devices 20, and image capture devices 22 that may be used to detect (e.g., capture images of) tokenized and/or dynamic authentication codes 24 of the physical checks 26. In certain embodiments, these points of interaction may include mechanisms for capturing images (e.g., a camera) and connecting through a communication network 28 to a banking network 30, and may run one or more applications or clients that allow a user to interact with the banking network (e.g., by submitting an image of a physical check 26 for processing). Such applications may provide access to electronic image check processing systems and interfaces along with traditional banking functionality such as withdrawals, balance inquiries, deposits, transfers, and so forth. In certain embodiments, an application (e.g., a mobile device application) may be self-verifying such that, when no network connectivity is available, authentication of a tokenized and/or dynamic authentication code 24 of a physical check 26 is possible via stored or local features of the application. As used herein, the term "physical check" may refer to a written order on physical media (e.g., paper) to a financial institution (e.g., a bank) to pay a specified sum of money, as indicated on the physical check 26, to a specified payee from a specified payor, also indicated on the physical check 26.

In addition, as used herein, the term "tokenized authentication code" may refer to an authentication code 24 of a physical check 26 that functions as a token to uniquely identify the physical check 26, wherein the authentication code 24 is uniquely associated with a particular user (e.g., bona fide holder of the physical check 26) and/or may be usable for a predetermined period of time, for example, expiring after the predetermined period of time. In addition, as used herein, the term "predetermined period of time" may refer to a period of time that is set (e.g., determined) prior to authentication of the physical check 26 and/or prior to authorization of a transfer of funds in accordance with information (e.g., check number, payor name and address, payee name, transfer amount, date, and so forth) presented on the physical check 26.

In addition, as used herein, the term "dynamic authentication code" may refer to an authentication code 24 of a physical check 26 that may change over time, for example, change values, change colors, become visible or otherwise observable for a period of time and then become invisible or otherwise not observable after the period of time, and so forth. Indeed, as described in greater detail herein, a dynamic authentication code 24 may change values, colors, visibility, and so forth, at a relatively high frequency (e.g., greater than once per second, greater than 3 times per second, greater than 5 times per second, greater than 10 times per second, greater than 20 times per second, greater than 30 times per second, or even more) in substantially real time such that a human observing the dynamic authentication code 24 may not be able to perceive (and/or act upon) any particular state (e.g., value, color, visibility, and so forth) of the dynamic authentication code 24 at any given time, whereas the devices described herein are able to perceive and act upon the dynamic authentication code 24. It will be appreciated that, in certain embodiments, an authentication code 24 of a physical check 26 may be both tokenized and dynamic. In addition, in certain embodiments, the tokenized and/or dynamic authentication code 24 of a physical check 26 may be encrypted in a format that may be decrypted by a check processing system 34, as described in greater detail herein. It will be appreciated that capturing images of (e.g., scanning) of tokenized and/or dynamic authentication codes 24 that change at relatively high frequencies in substantially real time enhances the ability to implement encryption/decryptions routines, for example, insofar as encrypted dynamic values of the tokenized and/or dynamic authentication codes 24 at any particular time may not be human-perceptible. Rather, only the devices described herein may be able to perceive and decrypt the encrypted dynamic values as they change in substantially real time. For example, in certain embodiments, an encrypted value of interest may only be determined based on multiple values of a tokenized and/or dynamic authentication code 24 as it changes over time.

In certain embodiments, dedicated terminals 12 such as public terminals/kiosks may be computers available to the public and/or specially designed kiosks that interact with the banking network 30. In addition, in certain embodiments, ATM networks 14 may be any set of ATMs in an interbank ATM network and/or intrabank ATM network. In addition, in certain embodiments, mobile devices 16 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), wearable computing devices such as smart glasses, smart watches, and so forth. In addition, in certain embodiments, personal computers 18 may be any computer (e.g., desktop computers, laptop computers, netbooks, tablet computers, Internet-enabled television devices, etc.) configured to communicate via the communication network 28. In addition, in certain embodiments, POS devices 20 may be any device used as a checkout for a merchant. For example, a POS device 20 may be a terminal located at the merchant, a computer-based interface such as a webpage or custom application, a telephone payment system, among others. In addition, in certain embodiments, image capture devices 22 may be any device (e.g., camera, scanner, and so forth) capable of capturing an image of the physical check 26 and communicating with the communication network 28. In general, each of the devices 12, 14, 16, 18, 20, 22 illustrated in FIG. 1 may be referred to as computing devices 32 that may be configured to detect (e.g., capture images of) tokenized and/or dynamic authentication codes 24 of the physical checks 26, and communicate these tokenized and/or dynamic authentication codes 24 to a check processing system 34 (e.g., of the banking system 30) via the communication network 28 for the purpose of automatically authenticating physical checks 26 associated with the tokenized and/or dynamic authentication codes 24, in turn, for the purpose of automatically authorizing transfers of funds in response to the authentication, as illustrated in FIG. 2.

Returning to FIG. 1, in certain embodiments, the banking network 30 may include any number of membership organizations, banks, credit unions, or other financial institutions. In certain embodiments, the banking network 30 may use a variety of interaction methods, protocols, and systems. For example, in certain embodiments, the banking network 30 may use any of the automated clearing house (ACH) networks. For example, an ACH network may be operated by NACHA (previously referred to as the National Automated Clearing House Association), whereas another ACH network may be the Electronic Payments Network (EPN). These ACH networks may interact to settle ACH transactions involving a party that has a relationship with only NACHA's ACH network or only the EPN. In other embodiments, other banking networks 30, such as CIRRUS, NYCE, and PULSE may also be used.

As illustrated in FIG. 1, in certain embodiments, the banking network 30 may be communicatively coupled to one or more databases such as a financial account database 36 and a member database 38. These databases 36, 38 may have a variety of information that can be utilized by the check processing system 34 described herein. For example, in certain embodiments, the financial account database 36 may include account information for members of a financial institution. In addition, in certain embodiments, the member database 38 may store information about members (or customers) of a membership organization (or financial institution). For example, in certain embodiments, the membership database 38 may include information such as employer, total balance of all accounts held at the membership organization, credit ratings, home ownership information, annual salary, length of membership, and/or other information. In certain embodiments, these databases 36, 38 may be integrated into a single database. In certain embodiments, a computer system associated with a membership organization, a bank, a credit union, or other financial institution within banking network 30 may be able to access these (and other) databases 36, 38 for account information, customer information, and other stored information.

Figure 2:
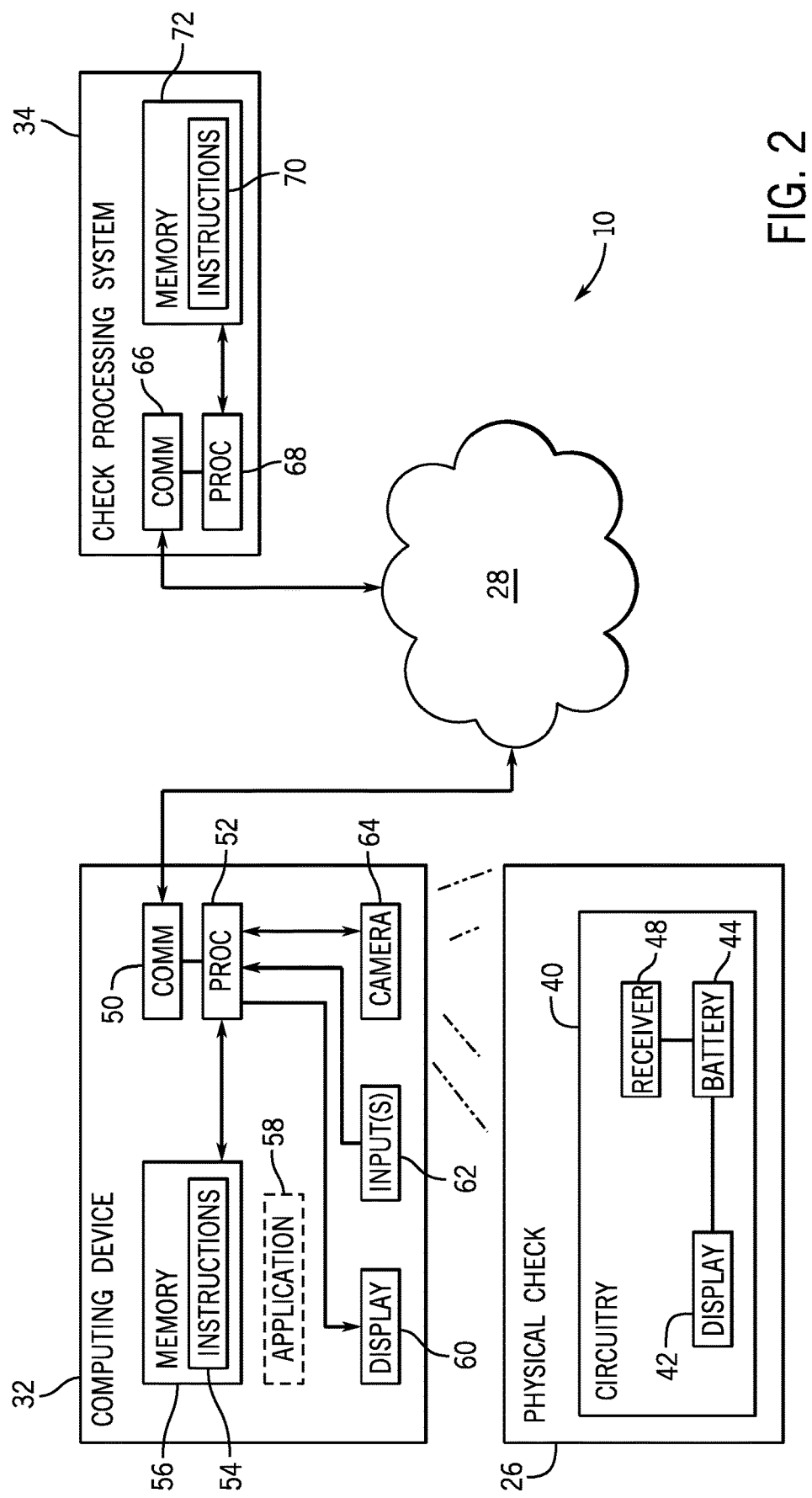
FIG. 2 is a schematic diagram of the operating environment of FIG. 1, in accordance with embodiments described herein.

FIG. 2 is a schematic diagram of the operating environment 10 (e.g., a physical check authentication system) of FIG. 1. As illustrated in FIG. 2, a computing device 32 (e.g., a dedicated terminal 12, an ATM network 14, a mobile device 16, a personal computer 18, a POS device 20, or an image capture device 22 of FIG. 1) may be used to detect (e.g., capture an image of) a tokenized and/or dynamic authentication code 24 of a physical check 26, and may communicate with a check processing system 34 (e.g., of the banking network 30 of FIG. 1) via a communication network 28) for the purpose of automatically authenticating the physical check 26 associated with the tokenized and/or dynamic authentication code 24, in turn, for the purpose of automatically authorizing transfers of funds in response to the authentication.

As described in greater detail herein, in certain embodiments, the tokenized and/or dynamic authentication code 24 of the physical check 26 may be a single use, tokenized version of an account number (e.g., relating to a user of a banking network 30) associated with the physical check 26. For example, when read (e.g., scanned) by a computing device 32 (e.g., a dedicated terminal 12, an ATM network 14, a mobile device 16, a personal computer 18, a POS device 20, or an image capture device 22 of FIG. 1), the tokenized and/or dynamic authentication code 24 may facilitate communication with the check processing system 34. However, since the tokenized and/or dynamic authentication code 24 is a single use, tokenized version of an account number associated with the physical check 26, only a single financial institution (e.g., banking network 30) would be able to access the tokenized and/or dynamic authentication code 24, thereby preventing any other entities from copying the physical check 26 in the future. For example, if another entity attempted to copy the tokenized and/or dynamic authentication code 24 in the future, it would not work. In other words, each physical check 26 having a tokenized and/or dynamic authentication code 24 would be unique, and only assigned an appropriate meaning/value when properly read based on correlated data. Indeed, as described in greater detail herein, in certain embodiments, once read (e.g., scanned) by a computing device 32, the tokenized and/or dynamic authentication code 24 may be deactivated such that the tokenized and/or dynamic authentication code 24 may no longer be observable, much less usable. In certain embodiments, the tokenized and/or dynamic authentication code 24 may take the form of a quick response (QR) code that may be read by any of the computing devices 32 illustrated in FIG. 1.

As illustrated in FIG. 2, in certain embodiments, the physical check 26 may include circuitry 40 configured to activate its associated tokenized and/or dynamic authentication code 24. For example, in certain embodiments, the circuitry 40 of the physical check 26 may include a relatively low-power display device 42 (e.g., an organic light-emitting diode (OLED), electronic paper utilizing electronic ink, and so forth) that may be powered by a relatively low-power battery 44 to display the tokenized and/or dynamic authentication code 24 (i.e., to make the tokenized and/or dynamic authentication code 24 visible on the physical check 26). In certain embodiments, the physical check 26 may include chargers for maintaining power in the low-power battery 44. Such chargers may include piezoelectric substrates, solar cells, and the like, which may be communicatively coupled to or integral with the low-power battery 44. Indeed, the illustrated low-power battery 44 may represent one or more batteries and chargers.

Figure 3:
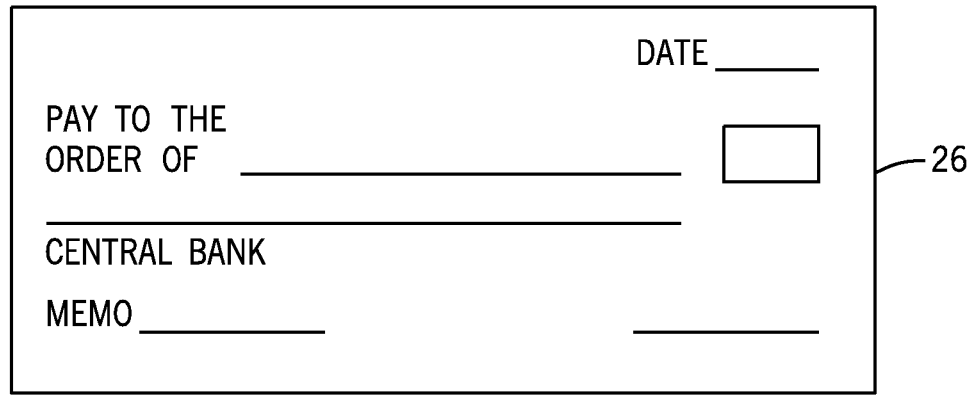
FIG. 3 illustrates a physical check that has a deactivated tokenized and/or dynamic authentication code, in accordance with embodiments described herein.
Figure 4:
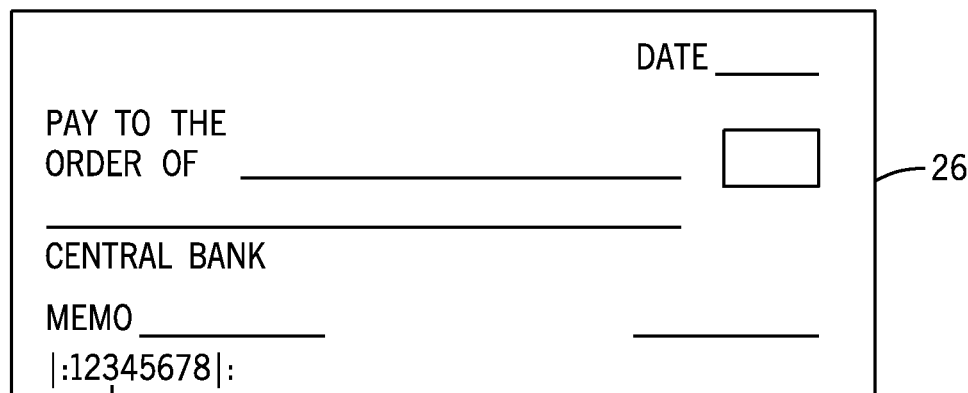
FIG. 4 illustrates a physical check that has an activated tokenized and/or dynamic authentication code, in accordance with embodiments described herein.

For example, FIG. 3 illustrates a physical check 26 that has a deactivated tokenized and/or dynamic authentication code 24 (i.e., before the tokenized and/or dynamic authentication code 24 has been activated). Once the battery 44 becomes powered, the battery 44 may provide power to the display device 42, thereby enabling the display device 42 to display the tokenized and/or dynamic authentication code 24, as illustrated in FIG. 4. Conversely, once power is removed from the battery 44, the display device 42 may become deactivated, thereby causing the tokenized and/or dynamic authentication code 24 to disappear (e.g., to make the tokenized and/or dynamic authentication code 24 invisible on the physical check 26), as illustrated in FIG. 3.

Figure 5:
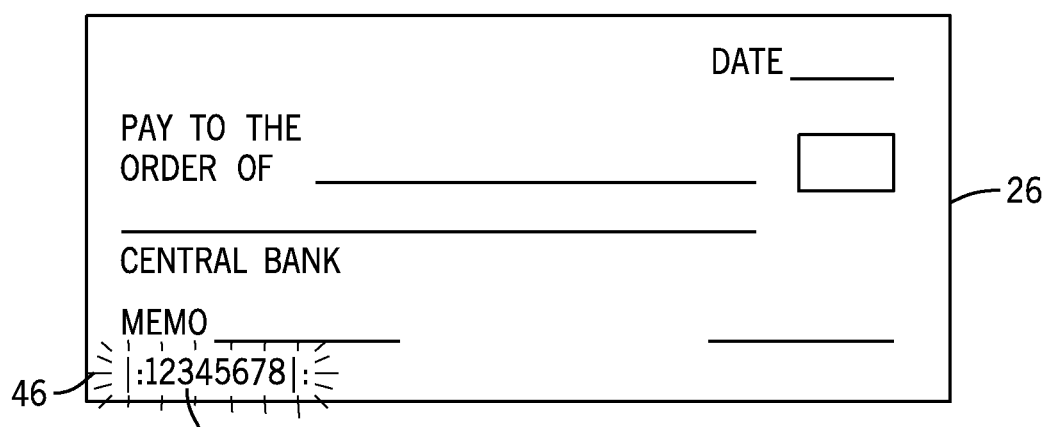
FIG. 5 illustrates a physical check that has an activated tokenized and/or dynamic authentication code having color coding applied to it, in accordance with embodiments described herein.

In addition, as illustrated in FIG. 5, in certain embodiments, color coding 46 of the tokenized and/or dynamic authentication code 24 may be activated (e.g., displayed) by the display device 42. For example, in certain embodiments, the tokenized and/or dynamic authentication code 24 may be caused to glow green when an appropriate relationship is established with a computing device 32, and may be caused to glow red when an invalid attempt to activate the physical check 26 is performed via a computing device 32, as described in greater detail herein. In other words, when a user of the computing device 32 is properly authenticated with respect to a physical check 26 (e.g., by the check processing system 34), a control signal may be sent from the computing device 32 to the circuitry 40 of the physical check 26 to cause the tokenized and/or dynamic authentication code 24 of the physical check 26 to glow green. Conversely, if a user of the computing device 32 is determined to not be properly authenticated with respect to the physical check 26 (e.g., by the check processing system 34), a control signal may be sent from the computing device 32 to the circuitry 40 of the physical check 26 to cause the tokenized and/or dynamic authentication code 24 of the physical check 26 to glow red.

Figure 6A:
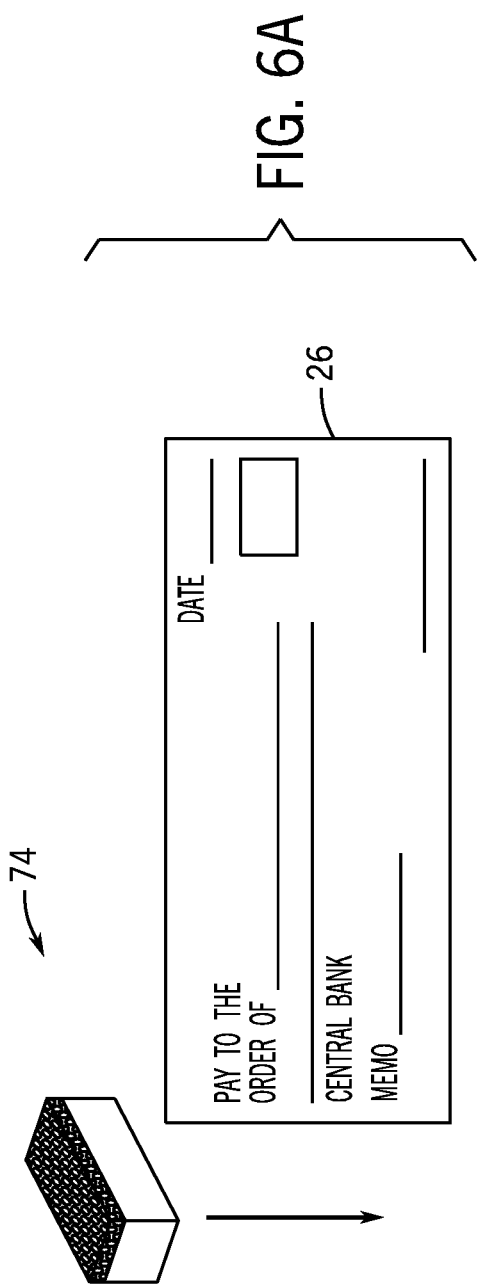
FIGS. 6A and 6B illustrate a physical check before and after, respectively, a wet sponge has been applied to the physical check, in accordance with embodiments described herein.
Figure 6B:
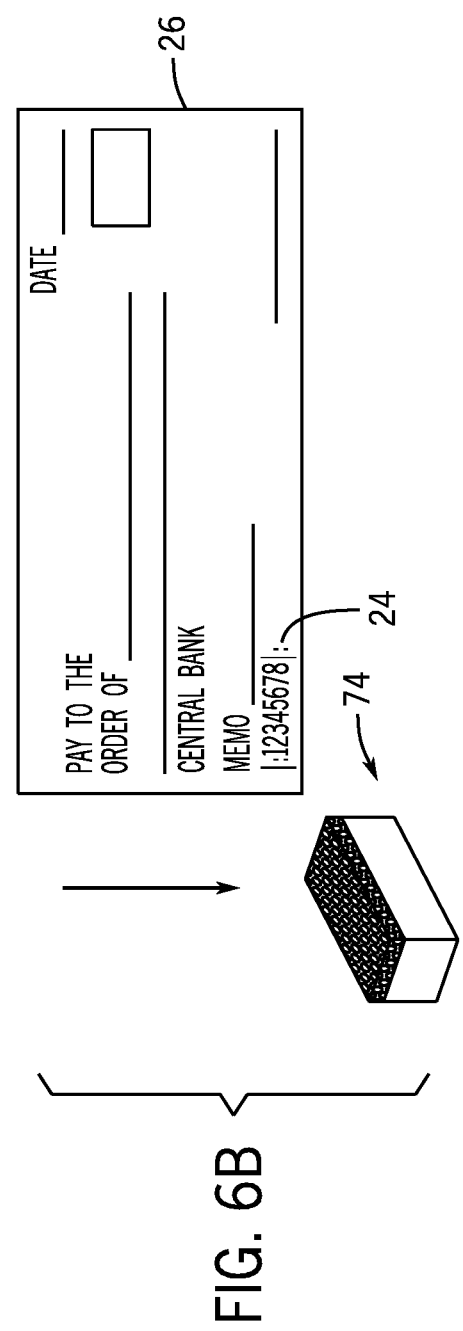

The battery 44 of the circuitry 40 of the physical check 26 may be activated in various ways. In certain embodiments, the battery 44 may be a moisture-activated (e.g., water-activated) battery configured to be activated by the application of moisture, such as saliva, moisture applied by a wet sponge, and so forth. For example, FIGS. 6A and 6B illustrate a physical check 26 before and after, respectively, a wet sponge 74 has been applied to the physical check 26. As illustrated, the moisture from wet sponge 74 may activate a water-activated battery 44 of the circuitry 40 of the physical check 26, the power from which enables the display device 42 of the physical check 26 to display the tokenized and/or dynamic authentication code 24 of the physical check 26. It will be appreciated that, in certain embodiments, once the moisture applied by the wet sponge 74 has dried, the water-activated battery 44 of the circuitry 40 of the physical check 26 may be deactivated, thereby deactivating (e.g., cease displaying) the tokenized and/or dynamic authentication code 24 of the physical check 26. In addition, in certain embodiments, rather than activating a battery 44 of the physical check 26 to, in turn, activate a display device 42 of the physical check 26, the wet sponge 74 may instead be used to cause the tokenized and/or dynamic authentication code 24 to change from an invisible color (e.g., white against a white physical medium of the physical check 26) to a visible color (e.g., black against the white physical medium of the physical check 26).

Figure 7:
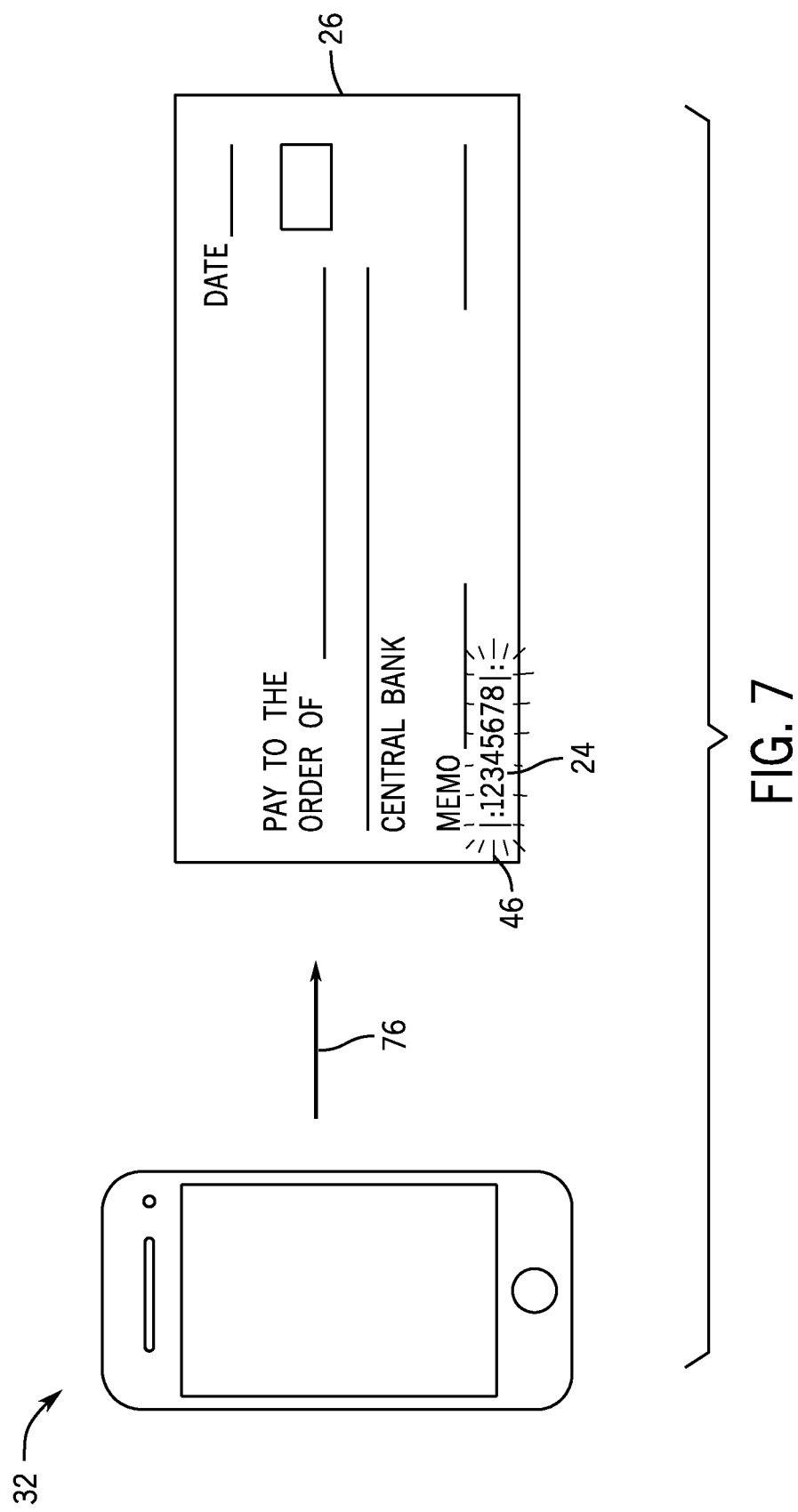
FIG. 7 illustrates a computing device wirelessly transmitting a control signal to circuitry of a physical check to activate a battery of the physical check, in accordance with embodiments described herein.

However, in other embodiments, the battery 44 may be activated by a control signal received from a computing device 32 via a receiver 48 of the circuitry 40 of the physical check 26. For example, in certain embodiments, when a physical check 26 is paired with a particular computing device 32 (e.g., when an authenticated user accesses the computing device 32), a control signal may be sent wirelessly from communication circuitry 50 of the computing device 32 to the receiver 48 of the circuitry 40 of the physical check 26 to activate the battery 44. For example, FIG. 7 illustrates a computing device 32 wirelessly transmitting a control signal 76 to circuitry 40 of a physical check 26 to activate the battery 44 of the physical check 26 (e.g., to activate a tokenized and/or dynamic authentication code 24 of the physical check 26). As described in greater detail herein, in certain embodiments, a control signal 76 may also be wirelessly transmitted from a computing device 32 to circuitry 40 of a physical check 26 to deactivate the battery 44 of the physical check 26 (e.g., to deactivate a tokenized and/or dynamic authentication code 24 of the physical check 26).

Figure 8:
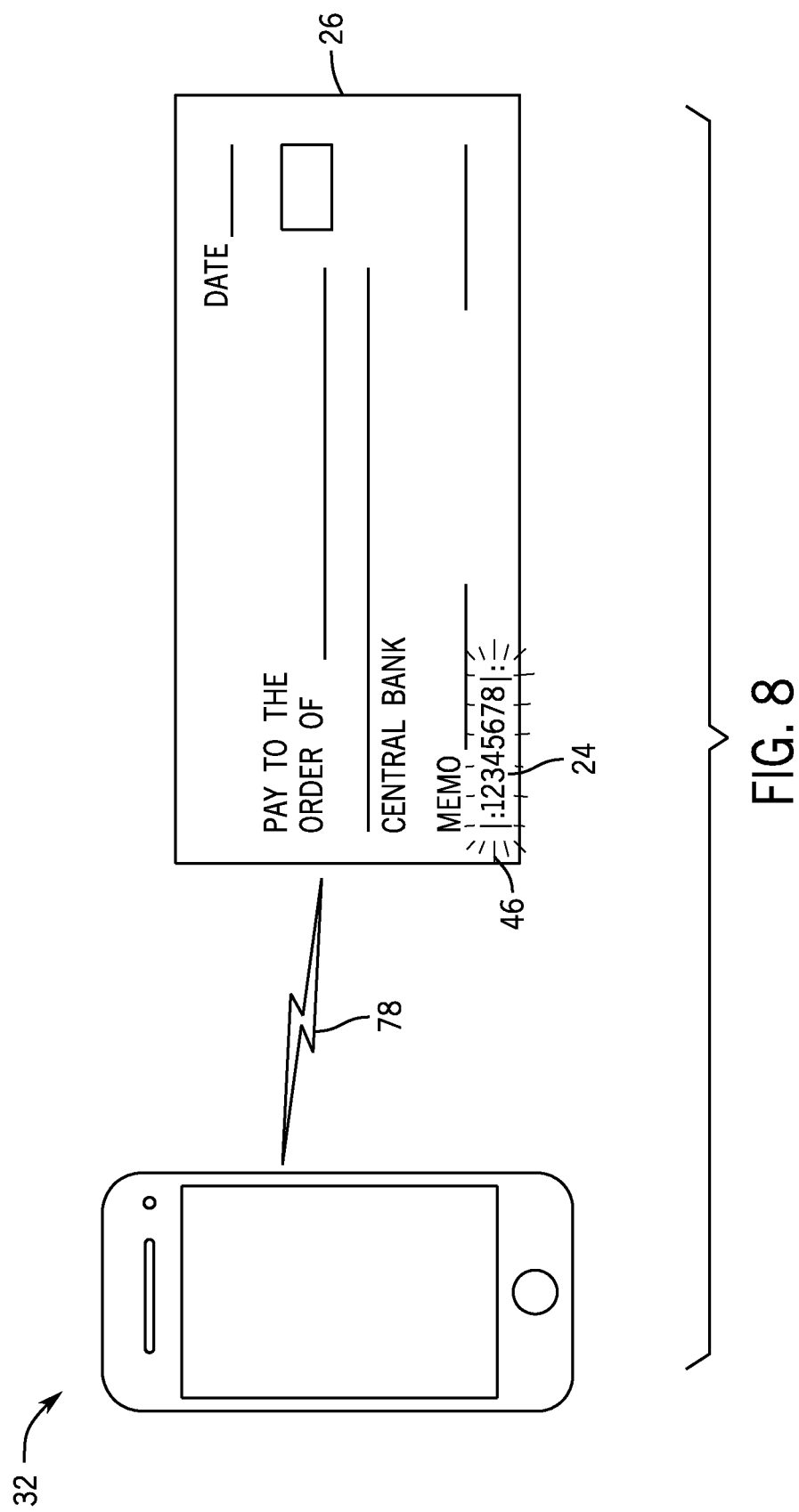
FIG. 8 illustrates a computing device wirelessly transferring inductance to a battery of a physical check to activate the battery when the computing device is brought into close proximity to the physical check, in accordance with embodiments described herein.

In certain embodiments, the battery 44 may be activated by inductance that is wirelessly provided by a computing device 32 to a physical check 26 having the battery 44. For example, in certain embodiments, when a physical check 26 is brought into close proximity to (e.g., within a few inches of) a particular computing device 32, inductance 78 may be wirelessly transferred from the computing device 32 to a battery 44 of the physical check 26 to activate the battery 44. For example, FIG. 8 illustrates a computing device 32 wirelessly transferring inductance to a battery 44 of a physical check 26 to activate the battery 44 (e.g., to activate a tokenized and/or dynamic authentication code 24 of the physical check 26) when the computing device 32 is brought into close proximity to the physical check 26. As described in greater detail herein, in certain embodiments, the wireless transfer of inductance 78 may cease when the computing device 32 is moved away from the close proximity to the physical check 26, thereby deactivating the battery 44 of the physical check 26 (e.g., to deactivate a tokenized and/or dynamic authentication code 24 of the physical check 26).

Figure 9:
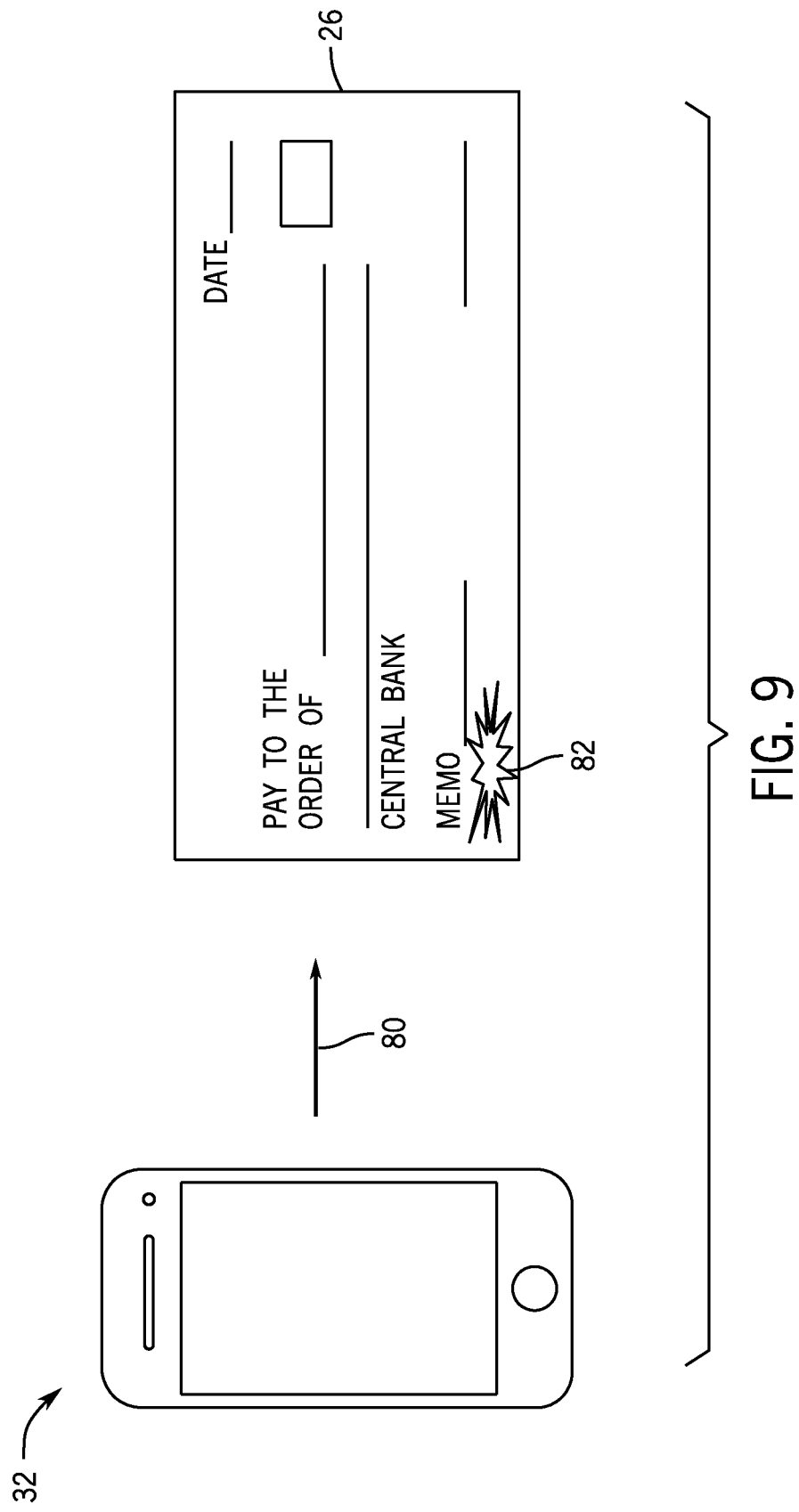
FIG. 9 illustrates a physical check destroying a display device of the physical check in response to an invalid attempt to transfer funds using the physical check, in accordance with embodiments described herein.

In addition, in certain embodiments, the display devices 42 of the physical checks 26 may be destroyed in response to an invalid attempt to activate tokenized and/or dynamic authentication codes 24 associated with the physical checks 26. For example, as illustrated in FIG. 9, in certain embodiments, in response to a computing device 32 and/or the check processing system 34 determining that an invalid attempt (e.g., unauthorized access) to transfer funds using a particular physical check 26 has been made, the computing device 32 and/or the check processing system 34 may wirelessly send a control signal 80 to the particular physical check 26 to apply an amount of power 82 from the battery 44 of the physical check 26 to the display device 42 of the physical check 26 that causes the display device 42 to become unusable (e.g., by increasing heat applied to the display device 42 (and/or to an electrical connection, such as a fuse wire connecting the battery 44 to the display device 42) due to excessive current and/or voltage applied by the battery 44).

To enhance the single-use nature of the tokenized and/or dynamic authentication code 24 of the physical check 26, in certain embodiments, the battery 44 that is used to power the display device 42 to display the tokenized and/or dynamic authentication code 24 may be configured to only stay powered for a relatively brief predetermined period of time (e.g., 30 minutes, 15 minutes, 10 minutes, 5 minutes, or even less), after which the tokenized and/or dynamic authentication code 24 may be deactivated (e.g., reverting to the state illustrated in FIG. 3). In certain embodiments, the relatively brief predetermined period of time that the battery 44 may remain powered may be simply determined based on the life of the battery 44. For example, in certain embodiments, the battery 44 may be configured to run out of power after the relatively brief predetermined period of time has elapsed. However, in other embodiments, the battery 44 may be deactivated by a control signal received from the computing device 32 and/or the check processing system 34 via the receiver 48 of the circuitry 40 of the physical check 26. In addition, in embodiments where the battery 44 is powered by inductance 78 provided by the computing device 32 (see FIG. 8), the battery 44 may be deactivated by the computing device 32 discontinuing provision of the inductance 78.

As described herein, in certain embodiments, a computing device 32 may be configured to activate the tokenized and/or dynamic authentication code 24 of the physical check 26. For example, in certain embodiments, the computing device 32 may include at least one processor 52 configured to execute instructions 54 stored in at least one memory medium 56 of the computing device 32, wherein the instructions 54, when executed by the at least one processor 52, cause the computing device 32 to perform the functions described herein. For example, in certain embodiments, the computing device 32 may be configured to execute software (e.g., one or more application(s) 58) to activate/deactivate the tokenized and/or dynamic authentication code 24 of the physical check 26 and/or to scan the tokenized and/or dynamic authentication code 24 of the physical check 26, as described in greater detail herein. Indeed, in certain embodiments, the computing device 32 may determine the tokenized and/or dynamic authentication code 24 for a particular physical check 26 using an application 58 being executed on the computing device 32. As illustrated, in certain embodiments, the computing device 32 may include a display device 60 and one or more input(s) 62 configured to facilitate a user of the computing device 32 to interact with the computing device 32 to facilitate the functionality described herein.

While the tokenized and/or dynamic authentication code 24 of the physical check 26 is activated, any one of the computing devices 32 and/or check processing systems 34 illustrated in FIG. 2, regardless of whether they are the particular computing device 32 and/or check processing system 34 that activated the tokenized and/or dynamic authentication code 24, may be configured to detect (e.g., capture an image of) the tokenized and/or dynamic authentication code 24 for the purpose of automatically authenticating the physical check 26 that includes the tokenized and/or dynamic authentication code 24. For example, in certain embodiments, a computing device 32 may include a camera device 64 configured to capture an image of (e.g., scan) a tokenized and/or dynamic authentication code 24 of a physical check 26, and may communicate the captured image of the tokenized and/or dynamic authentication code 24 of the physical check 26 to communication circuitry 66 of the check processing system 34 (e.g., of the banking system 30) via the communication network 28.

As described herein, in certain embodiments, the tokenized and/or dynamic authentication code 24 of the physical check 26 may change values, colors, visibility, and so forth, at a relatively high frequency (e.g., greater than once per second, greater than 3 times per second, greater than 5 times per second, greater than 10 times per second, greater than 20 times per second, greater than 30 times per second, or even more) in substantially real time such that a human observing the tokenized and/or dynamic authentication code 24 may not be able to perceive (and/or act upon) any particular state (e.g., value, color, visibility, and so forth) of the tokenized and/or dynamic authentication code 24 at any given time. However, in contrast, the camera device 64 may be configured to capture images of the tokenized and/or dynamic authentication code 24 at such frequencies (or even higher frequencies) such that the computing devices 32 and/or check processing systems 34 illustrated in FIG. 2 may identify the tokenized and/or dynamic authentication code 24 as it changes over time, and may use the dynamic versions of the tokenized and/or dynamic authentication code 24 to automatically authenticate the physical check 26, as described in greater detail herein.

For example, as described herein, in certain embodiments, the check processing system 34 may be configured to automatically authenticate the physical check 26 based on the tokenized and/or dynamic authentication code 24 associated with the physical check 26, an image of which is received from a computing device 32. For example, in certain embodiments, the check processing system 34 may include at least one processor 68 configured to execute instructions 70 stored in at least one memory medium 72 of the check processing system 34, wherein the instructions 70, when executed by the at least one processor 68, cause the check processing system 34 to perform the functions described herein. For example, in certain embodiments, the instructions 70, when executed by the at least one processor 68, cause the check processing system 34 to identify a tokenized and/or dynamic authentication code 24 of a physical check 26 (e.g., based on the image of the tokenized and/or dynamic authentication code 24 captured by a computing device 32), to automatically authenticate the physical check 26 based at least in part on the identified tokenized and/or dynamic authentication code 24, and to automatically authorize a transfer of funds in response to the authentication of the physical check 26.

Figure 10:
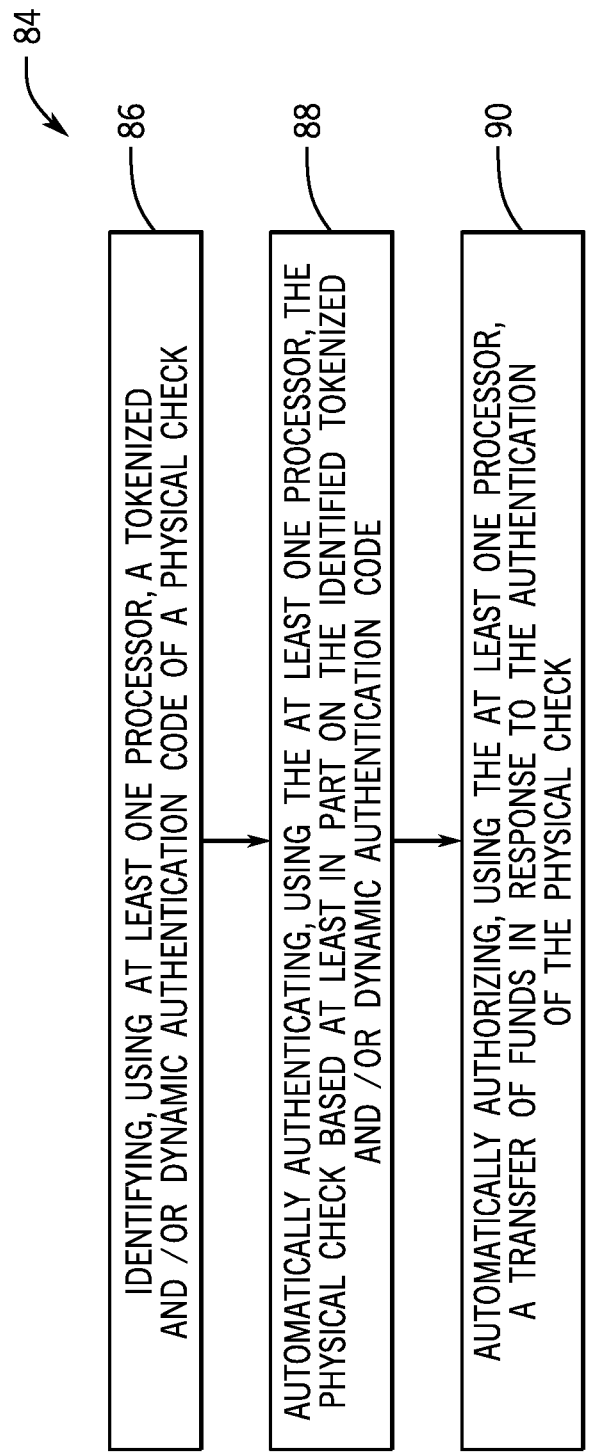
FIG. 10 is a flow diagram of a method of authenticating and authorizing a physical check using a check processing system, in accordance with embodiments described herein.

FIG. 10 is a flow diagram of a method 82 of authenticating and authorizing a physical check 26 using the check processing system 34 illustrated in FIG. 2. As illustrated in FIG. 10, in certain embodiments, the method 84 includes identifying, using at least one processor 68 of the check processing system 34, a tokenized and/or dynamic authentication code 24 of the physical check 26 (block 86). In addition, in certain embodiments, the method 84 includes automatically authenticating, using the at least one processor 68 of the check processing system 34, the physical check 26 based at least in part on the identified tokenized and/or dynamic authentication code 24 (block 88). In addition, in certain embodiments, the method 84 includes automatically authorizing, using the at least one processor 68 of the check processing system 34, a transfer of funds in response to the authentication of the physical check 26 (block 90). As described in greater detail herein, in certain embodiments, the tokenized and/or dynamic authentication code 24 includes a single use tokenized version of an account number associated with the physical check 26.

In certain embodiments, activating the tokenized and/or dynamic authentication code 24 includes activating circuitry 40 of the physical check 26. In certain embodiments, the circuitry 40 of the physical check 26 may be activated based at least in part on moisture applied to a battery 40 of the physical check 26 (see FIGS. 6A and 6B). In addition, in certain embodiments, activating the tokenized and/or dynamic authentication code 24 includes displaying the tokenized and/or dynamic authentication code 24 via a display device 42 of the physical check 26. In addition, in certain embodiments, activating the tokenized and/or dynamic authentication code 24 includes activating color coding of the tokenized and/or dynamic authentication code 24 using the circuitry 40 of the physical check 26.

In addition, in certain embodiments, the method 82 may optionally include activating the circuitry 40 of the physical check 26 based at least in part on a control signal received from a computing device 32. In addition, in certain embodiments, the tokenized and/or dynamic authentication code 24 may be determined by an application 58 executed by the computing device 32. In addition, in certain embodiments, the method 82 may optionally include activating the tokenized and/or dynamic authentication code 24 by providing inductance 78 to the circuitry 40 of the physical check 26 from the computing device 32, and deactivating the tokenized and/or dynamic authentication code 24 by discontinuing the inductance 78 provided to the circuitry 40 of the physical check 26 from the computing device 32 (see FIG. 8). In addition, in certain embodiments, activating the tokenized and/or dynamic authentication code 24 may include sending a control signal 76 from the computing device 32 to the circuitry 40 of the physical check 26 to cause the tokenized and/or dynamic authentication code 24 to become visible (see FIG. 7).

In addition, in certain embodiments, the method 82 may optionally include deactivating the tokenized and/or dynamic authentication code 24 by deactivating the circuitry 40 of the physical check 26 after a predetermined period of time. In certain embodiments, the predetermined period of time may be determined by a life of a battery 44 of the physical check 26, which activates the circuitry 40 of the physical check 26. In addition, in certain embodiments, deactivating the tokenized and/or dynamic authentication code 24 includes causing the tokenized and/or dynamic authentication code 24 to become invisible. In addition, in certain embodiments, deactivating the tokenized and/or dynamic authentication code 24 includes causing a display device 42 displaying the tokenized and/or dynamic authentication code 24 to become unusable (see FIG. 9).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A method, comprising:
    identifying, using at least one processor, a dynamic authentication code of a physical check, wherein the dynamic authentication code comprises a single use tokenized version of an account number associated with the physical check;
    automatically authenticating, using the at least one processor, the physical check based at least in part on the identified dynamic authentication code; and
    automatically authorizing, using the at least one processor, a transfer of funds in response to the authentication of the physical check.

2. The method of claim 1, comprising activating the dynamic authentication code by activating circuitry of the physical check.

3. The method of claim 2, comprising deactivating the dynamic authentication code by deactivating the circuitry of the physical check after a period of time.

4. The method of claim 3, wherein deactivating the dynamic authentication code comprises causing the dynamic authentication code to become invisible.

5. The method of claim 3, wherein the period of time is determined by a life of a battery of the physical check that activates the circuitry of the physical check.

6. The method of claim 2, comprising activating the circuitry of the physical check based at least in part on moisture applied to a battery of the physical check.

7. The method of claim 2, wherein activating the dynamic authentication code comprises displaying the dynamic authentication code via a display device of the physical check.

8. The method of claim 2, comprising activating color coding of the dynamic authentication code using the circuitry of the physical check.

9. The method of claim 2, comprising activating the circuitry of the physical check based at least in part on a control signal received from a computing device.

10. The method of claim 9, wherein the dynamic authentication code is determined using an application executed by the computing device.

11. The method of claim 9, comprising:
activating the dynamic authentication code by providing inductance to the circuitry of the physical check from the computing device; and
deactivating the dynamic authentication code by discontinuing the induction provided to the circuitry of the physical check from the computing device.

12. The method of claim 9, wherein activating the dynamic authentication code comprises sending a control signal from the computing device to the circuitry of the physical check to cause the dynamic authentication code to become visible.

13. The method of claim 9, comprising destroying a display device of the physical check in response to an invalid attempt to activate the dynamic authentication code using the computing device.

14. A physical check, comprising:
circuitry configured to be activated to activate a dynamic authentication code of the physical check, wherein the dynamic authentication code comprises a single use tokenized version of an account number associated with the physical check, and wherein the dynamic authentication code is configured to uniquely identify the physical check and is used to authorize a transfer of funds in response to authentication of the physical check.

15. The physical check of claim 14, wherein the circuitry is configured to be deactivated after a period of time to deactivate the dynamic authentication code.

16. The physical check of claim 14, wherein the circuitry of the physical check is configured to be activated based at least in part on moisture applied to a battery of the physical check.

17. The physical check of claim 14, comprising a display device, wherein the circuitry of the physical check is configured to display the dynamic authentication code via the display device of the physical check.

18. The physical check of claim 14, wherein the circuitry of the physical check is configured to activate color coding of the dynamic authentication code.

19. A physical check authentication system, comprising:
a physical check comprising a display device and circuitry, wherein the circuitry is configured to display a dynamic authentication code via the display device in response to activation of the circuitry; and
an authenticator comprising at least one processor configured to read the dynamic authentication code from the display device, and to authorize a transfer of funds in response to authentication of the physical check.

20. The physical check authentication system of claim 19, wherein the dynamic authentication code comprises a single use tokenized version of an account number associated with the physical check.

* * * * *